United States Patent Office 2,978,589
Patented Apr. 4, 1961

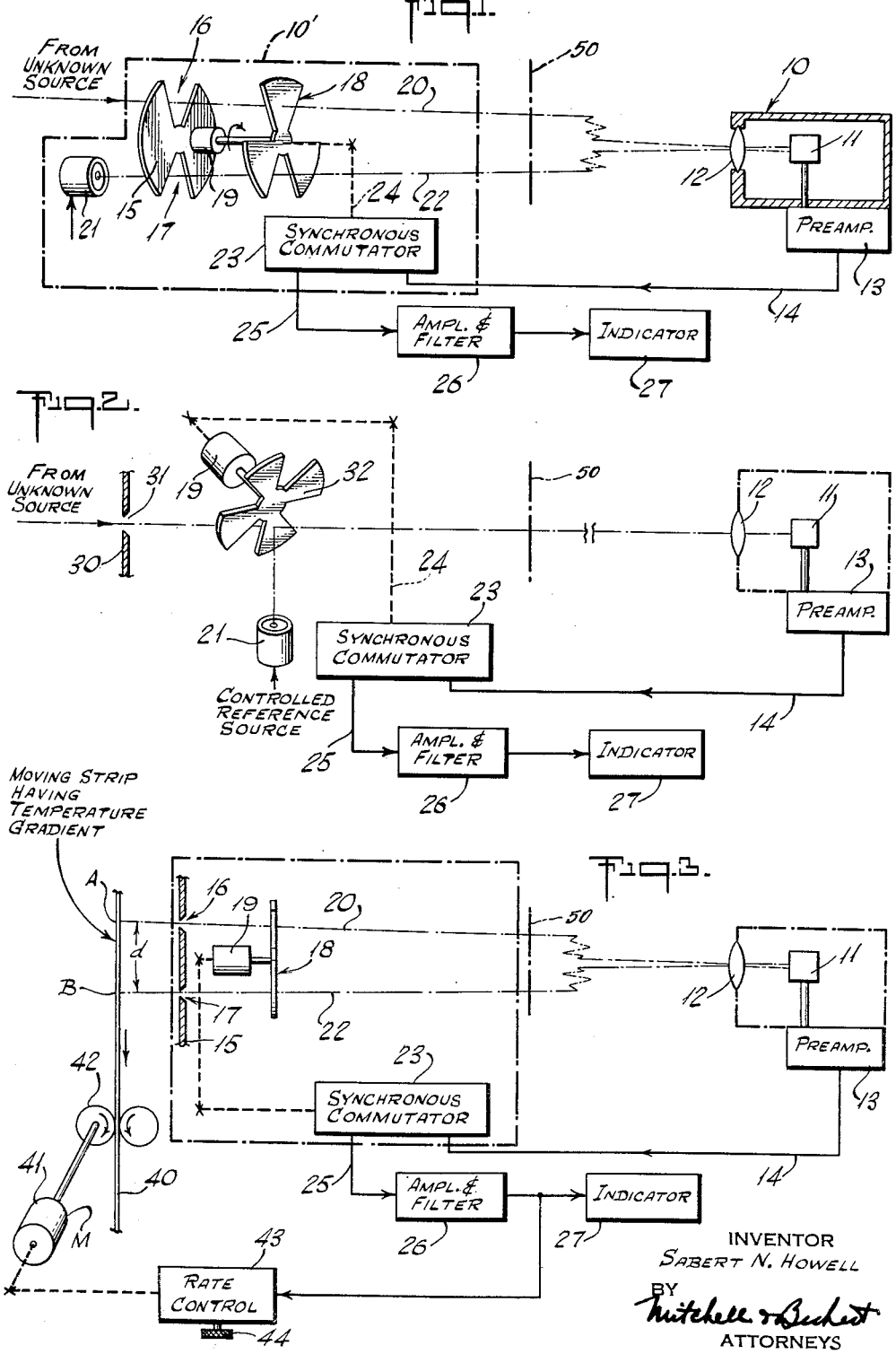

2,978,589

OPTICAL PYROMETER

Sabert N. Howell, Huntington, N.Y., assignor to Servo Corporation of America, New Hyde Park, N.Y., a corporation of New York Filed Jan. 16, 1956, Ser. No. 559,288

14 Claims. (Cl. 250—233)

My invention relates to an improved radiation pyrometer construction.

To my knowledge, radiation pyrometers have, in the past, comprised single integral units which, though portable, must nevertheless be bodily positioned in accordance with the requirements of observing a particular unknown source. When the source to be observed is an intensely heated large mass, or is within a dense radioactive field, or is otherwise encumbered, as by machinery and the like, it is difficult and often impossible to place the whole pyrometer assembly in the most advantageous position to obtain a reading on a localized source.

It is, accordingly, an object of the invention to provide an improved pyrometer construction not subject to the above-mentioned disadvantages.

It is another object to provide an improved radiation pyrometer separable into two flexibly cooperating independent components.

It is a specific object to meet the above objects with a pyrometer construction in which delicate heat-detecting elements are contained within a first unit which may be disposed safely remote from the encumbered regions surrounding a localized heat source to be observed, and in which a second mechanically independent unit comprising more rugged mechanical parts may be selectively placed within the field of view of the first unit and closer to the source.

It is another specific object to provide an improved pyrometer construction wherein a single relatively wide-angle collecting optical system may serve in cooperation with an externally-mounted radiation-modulating assembly to develop a pyrometer response equivalent to that achieved through a telephoto lens.

It is another specific object to meet the above object with a pyrometer construction in which for a single remote placement of a conventional radiation pyrometer, a separate mechanical radiation-modulator unit may be moved around within the field of view of the pyrometer unit in order to permit selective localized probing within said field of view for a given unknown source.

Other objects and various further features of novelty and invention will be pointed out or will occur to those skilled in the art from a reading of the following specification in conjunction with the accompanying drawings. In said drawings, which show, for illustrative purposes only, preferred forms of the invention, Fig. 1 is a simplified optical and electrical diagram schematically indicating the relation of parts for one embodiment of my invention; and Figs. 2 and 3 are similar diagrams representing alternative embodiments.

Briefly stated, my invention contemplates an improved radiation pyrometer which may take the form of essentially two independent flexibly interconnected units, the first unit may comprise essentially an energy-responsive element or cell with means such as collecting optics for assuring exposure of said cell essentially to radiation incident from a single direction over a relatively wide angle of view. The other unit may be termed a modulator and may comprise a mask having an opening of limited area within the field of view of the pyrometer unit, and means such as a mechanical chopper for modulating the passage of radiation through said opening. The remote unit may further include a synchronous commutator tied to the chopper and accepting the electrical output of the cell, the interconnection between the two units being essentially only a flexible electrical interconnection.

Because the synchronous commutator serves as a selective filter, tuned to the modulation frequency of the chopper, the output of the commutator reflects only signal magnitudes modulated by the chopper, and thus for situations in which the remote unit is substantially distant from the pyrometer unit, extreme telephoto effects are obtained without in any way modifying the wide-angle nature of the collecting optics of the pyrometer.

The remote unit may include a reference source, and in that event the chopper mechanism is so devised as to alternately expose the cell first to the unknown source through the mask opening and then to the reference source. Since signal magnitudes reflecting the unknown source and the reference source are the only ones modulated at the chopper frequency, the synchronous commutator provides an output reflecting a direct comparison between the unknown source and the reference.

In another form, the mask has two openings exposed to different areas to be monitored, as when monitoring for a temperature difference between said areas, and the chopper serves to alternately expose said areas to the cell so that the commutator output may reflect the instantaneous direct comparison of the two radiations through the respective mask openings.

Referring to Fig. 1 of the drawings, my invention is shown in application to a pyrometer comprising two separate mechanical independent units 10—10' which may be separately mounted on tripods or otherwise, depending upon particular application requirements. The first or pyrometer unit 10 is shown to comprise a radiation-responsive cell 11 positioned within a housing at the focus of collecting optics 12, collecting radiation from a remote source. The field of view of optics 12 (as imaged on the cell 11) may be relatively large, as for example of a larger included angle than that embraced by the remote unit 10' in said field. The pyrometer unit 10 may also include a preamplifier 13 for raising the electrical signal output of the cell 11 to a level suitable for remote transmission, as in a flexible interconnection line 14 between the two units 10—10'.

The remote unit 10' is essentially a radiation modulator, and in the form shown comprises a mask 15 having two openings 16—17 of very limited size within the field of view of the optics 12. A chopper 18 is continuously driven by a motor 19 and is so oriented with respect to the mask 15 as to expose the cell 11 to radiation from an unknown source (as developed on a first axis 20) in alternation with radiation from a reference source 21 through the opening 17 (on a second axis 22). Thus, the video output of the cell 11 will be largely random, except for a consistent component having the modulation frequency of the chopper 18. A synchronous commutator 23 within the remote unit 11 is mechanically ganged (as suggested by connection 24) to the chopper 18 and is electrically connected to the output line 14 from the cell 11; the synchronous commutator may be as described on page 106 of the Standard Handbook for Electrical Engineers, edited by Knowlton, eighth edition, 1949. Thus, the commutator 23 serves as a filter tuned to the modulating frequency of the chopper 18 and passes into its output line 25 only signals reflecting said modulation frequency. In the form shown, this means that the output signal in line 25 will reflect a direct comparison between the instantaneous intensity of the unknown source and that of the reference source. Processing of the output signal in line 25 may be conventional, and I show amplifying and filter means 26 connected to a display indicator or recorder 27.

In use, my pyrometer unit 10 may be relatively fixedly mounted, as on a tripod remote from the localized unknown source to be probed for or otherwise observed, it being only necessary that such source be somewhere within the relatively wide angle of view of the collecting optics 12. The remote unit 10' may be moved around as necessary in relatively close proximity to the unknown source until it is ascertained that the opening 16 is in alignment with the unknown source and the optics 12. If one is probing for the hottest spot in a given area, location of the unknown source will be immediately apparent by the display at 27.

The drawing will be understood to be merely schematic, and the housing for the remote unit 10' will be therefore understood to be appropriate to the installation requirements; for example, when the unit 10' is to be placed closely alongside a furnace or even within a furnace, it will be understood that the enclosure 10' includes and incorporates cooling jackets and such other means of protection as necessary.

In Fig. 2, I show a modification of the arrangement of Fig. 1, and similar parts are given the same reference numerals. In the arrangement of Fig. 2, the mask 30 has but a single opening 31 for admission of radiation from the unknown source, and the blades 32 of the chopper or radiation modulator are mirror surfaces; blades 32 are so inclined with respect to the reference source 21 that the reference source 21 is imaged on cell 11 in alternation with the unknown source.

In Fig. 3, I show a specific application of my invention to automatic control of the feed rate for advancing a continuously moving strip 40 on which a prescribed temperature gradient is to be maintained. For example, a given constant temperature difference is to be maintained between the region A and the region B, and the feed rate, determined by speed of drive motor 41 in application to the feed roll 42, is to be adjusted as necessary to maintain the desired constant temperature difference between locations A and B, spaced the distance $d$ apart. The pyrometer parts may generally resemble those of Fig. 1, and again corresponding reference numerals are used where appropriate.

The essential difference between Figs. 1 and 3 is that in place of the reference source 21, the axis 22 is directly aligned with the second unknown region B on the moving strip 40, the axis 20 being aligned with the unknown region A. With the arrangement thus provided, the commutator output in line 25 reflects only a direct comparison between temperatures observed through openings 16—17 in the mask 15, and after amplification and filtering at 26, this signal may be applied to a rate-control device 43 in controlling relation with the motor 41. The rate-control device 43 may include manually adjustable means 44 for selecting the bias or coupling coefficient determining the control effect of the signal in line 25 on the speed of the motor 41. Thus, by adjusting the means 44, there may be selected, for the strip 40, a feed rate appropriate to the temperature gradient desired, as between the spaced locations A and B.

It will be seen that I have described a basically simple modification of existing pyrometer constructions which very substantially enhances the range of application of such device. Not only does my improvement render more flexible the installation and use of a given pyrometer system, but also my arrangement inherently produces selectively variable telephoto effects without in any way requiring modification of what may be a relatively wide-angle optical system 12 in the basic pyrometer unit. Still further flexibility may be achieved by folding the optical alignment, as by interposing an inclined plane mirror surface between the pyrometer unit 10 and the chopper unit 10', all as schematically suggested by the heavy phantom line 50 in the drawings. These effects are achieved with maximum flexibility involving merely flexible electrical cables between the major units, and no particular radiation shielding is required between the units 10—10'.

While I have described my invention in detail for the preferred forms shown, it will be understood that modification may be made within the scope of the invention at defined in the claims which follow.

I claim:

1. A radiation pyrometer, including a first mechanically independent unit, comprising a radiation-responsive element producing an electrical video output in response to variations in incident radiation, and optics collecting radiation from a remote source and focusing the same on said element; a second mechanically independent unit located in close proximity to said remote source comprising a chopper in the path of rays collected by said optics and signal-processing means including a synchronous commutator operating in synchronism with said chopper and connected to the video output of said element, whereby the output of said commutator may reflect only signals seen through said chopper to the exclusion of said signals that are not modulated by said chopper.

2. A radiation pyrometer, including a first mechanically independent unit comprising an energy-responsive element, and optics collecting radiation from a remote source and focusing the same on said element; a second mechanically independent unit located in close proximity to said remote source comprising a mask having a restricted opening within the field of view of said optics, a chopper continuously driven to alternately close and open the opening in said mask, and a synchronous commutator connected to said chopper and accepting the electrical output of said element; whereby the output of said commutator may reflect substantially only signals passing through said mask and modulated by said chopper.

3. In combination, a mechanically independent radiation pyrometer, comprising an energy-responsive element, and optics collecting energy from a remote source and focusing the same on said element; a mechanically independent modulator unit located in close proximity to said remote source comprising chopping means within the field of view of said optics and continuously driven to periodically open and close a restricted area within said field insofar as radiation collected by said optics is concerned, a reference source so oriented with respect to said chopper as to be exposed to said optics when said chopper has cut off radiation passing through said restricted area and to cut off said reference source when radiation passing through said restricted area is exposed to said optics, and a synchronous commutator synchronized with said chopper and accepting the electrical output of said electrical element, whereby the output of said commutator may continuously reflect signals representing an unknown source seen through said restricted area in comparison with signals representing said reference source.

4. A radiation pyrometer, including a first mechanically independent unit comprising an energy-responsive element having an electrical output responsive to incident radiation, and optics collecting energy from a remote source and focusing the same on said element, and a second mechanically independent unit located in proximity to said remote source and comprising, a mask having two similar and symmetrically placed openings within a limited region of the field view of said optics and energy-responsive element, a rotary chopper disposed to expose said optics to radiation passing through one of said mask openings in alternation with radiation passing through other of said mask openings, a synchronous commutator synchronized with rotation of said chopper and electrically accepting the output of said energy-responsive element, whereby the electrical output of said commutator may reflect the instantaneous comparison between radiation intensity as seen through the two openings in said mask.

5. A pyrometer according to claim 4, in which the field of view seen through one of said mask openings is open for exposure to an unknown source, and in which a reference source at said second mechanically independent unit is positioned in the field of view exposed through the other of said mask openings.

6. A temperature-gradient controlled feed mechanism, comprising means for supporting at a first location a continuous strip or the like of material on which the temperature gradient is to be observed, said means including a drive motor for advancing such material, a mask having two apertures spaced on the longitudinal axis of movement of said material, chopper means alternately opening and closing the two openings of said mask, an energy-responsive element at a remote location continuously exposed to energy passing through both of said openings as modulated by said chopper, a commutator synchronously connected to said chopper and accepting the electrical output of said energy-responsive element, and rate-control means for said motor and responsive to the electrical output of said commutator.

7. A device according to claim 6, in which said rate-control means includes a manually adjustable element in biasing relation with the output signal received from said commutator, whereby the temperature gradient for which a given feed rate applies may be selectively adjusted.

8. A radiation pyrometer, comprising an energy-responsive element having an electrical output responsive to incident radiation, optics collecting energy from a remote source and focusing same on said energy-responsive element; a mechanical modulator unit located in close proximity to said remote source comprising a mask having a restricted opening within the field of view of said optics, a chopper continuously driven to modulate energy received through said opening, said chopper being mounted for rotation on an axis inclined to the axis passing through said opening and said optics, said chopper including a mirrored surface; a reference source located in close proximity to said remote source and positioned with respect to said mirrored surface to be imaged by said optics on said energy-responsive element at times when said chopper occults the opening in said mask and being also positioned as not to be imaged on said element when said chopper admits radiation through said opening to said element, and a synchronous commutator synchronously tied to said chopper and accepting the electrical output of said energy-responsive element.

9. In combination, a mechanically independent pyrometer unit comprising a housing containing a radiation-responsive element, and optics collecting radiation from a remote source of unknown radiation outside said housing and focusing the same on said energy-responsive element; and a remote mechanically independent radiation-modulator unit in proximity to said remote source, comprising a fixed mask having a limited opening for placement within the view of said optics, a fixed reference source in said remote unit, and a mechanical light modulator alternately exposing said optics to radiation passing through said limited opening and to radiation from said reference source, said remote unit further including a synchronous commutator; and a flexible electrical connection from the output of said energy-responsive element to said synchronous commutator.

10. The combination of claim 9, in which said mask has two separate openings within the field of view of said optics, said source being positioned to substantially fill the field of view through one of said openings, and the field of view through the other of said openings being open so as to embrace an unknown source.

11. The combination of claim 9, in which said mask has a single opening and in which said chopper includes a plurality of blades having reflecting surfaces on one side thereof, the positioning of said source with respect to the inclination of said chopper blades being such as to cause said optics to image said reference source on said energy-responsive element in alternation with the image thereon of the opening through which exposure is made to an unknown source.

12. In combination, a mechanically independent pyrometer unit comprising a radiation-responsive cell having an electrical output for incident radiation, and optics collecting radiation from a remote source and focusing the same on said cell; and a remote radiation-modulating unit mechanically separate from said first unit and comprising a mask having two spaced limited openings both of which are within the field of view of said optics and cell, said remote unit further including rotary chopper means exposing radiation through one of said openings to said cell in alternation with radiation through the other of said openings, and a synchronous commutator synchronously related to rotation of said chopper means; and a flexible electrical connection from the output of said cell to said synchronous commutator.

13. The combination of claim 12, and including a strip-feed mechanism, including a drive motor therefor, said feed mechanism including rate-control means for said motor, and a flexible electrical connection between said commutator and said feed means, whereby said remote unit may be flexibly located with respect to strip on which the temperature gradient is to be monitored for controlling the feed rate thereof.

14. In combination, a mechanically independent radiation-pyrometer unit comprising an energy-responsive element having an electrical output for incident radiation, and optics having a relatively wide angle of view for viewing a remote source and focusing the energy therefrom on said element; a second mechanically independent modulator unit having means for adjustably locating the same in close proximity to said remote source, said modulator unit having an opening on an axis to be subjected to modulation, said axis being aligned with said optics within the field of view of said optics, said second unit including a chopper for periodically modulating energy passing through said opening on said axis, and signal-processing means tuned to the modulation frequency of said chopper and accepting the electrical output of said energy-responsive element.

References Cited in the file of this patent

UNITED STATES PATENTS

| | | |
|---|---|---|
| 1,970,103 | Runaldue | Aug. 14, 1934 |
| 2,066,934 | Gulliksen | Jan. 5, 1937 |
| 2,166,824 | Runaldue | July 18, 1939 |
| 2,418,845 | Long | Apr. 15, 1947 |
| 2,494,607 | Bouchet | Jan. 17, 1950 |
| 2,671,128 | Zworykin et al. | Mar. 2, 1954 |
| 2,856,811 | Kaye | Oct. 21, 1958 |

FOREIGN PATENTS

| | | |
|---|---|---|
| 666,786 | Great Britain | Feb. 20, 1952 |